United States Patent
Yamashita et al.

(10) Patent No.: US 9,985,503 B2
(45) Date of Patent: May 29, 2018

(54) MOTOR UNIT HAVING A DETECTOR INTERPOSED BETWEEN A MOTOR AND AN ARITHMETIC BOARD

(71) Applicant: JTEKT CORPORATION, Osaka-shi, Osaka (JP)

(72) Inventors: Manabu Yamashita, Okazaki (JP); Takashi Taninaga, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 300 days.

(21) Appl. No.: 14/972,749

(22) Filed: Dec. 17, 2015

(65) Prior Publication Data

US 2016/0190898 A1   Jun. 30, 2016

(30) Foreign Application Priority Data

Dec. 25, 2014   (JP) .................................. 2014-262982

(51) Int. Cl.
*H02K 11/00* (2016.01)
*H02K 11/225* (2016.01)
*H02K 29/12* (2006.01)

(52) U.S. Cl.
CPC ....... *H02K 11/225* (2016.01); *H02K 11/0015* (2013.01); *H02K 11/0073* (2013.01); *H02K 29/12* (2013.01)

(58) Field of Classification Search
CPC ...... H02K 11/225; H02K 11/21; H02K 29/12; H02K 11/0015; H02K 11/0073; H02K 11/215; H02K 5/18; H02K 9/22
USPC .................................. 310/68 B, 68 R, 58, 64
See application file for complete search history.

(56) References Cited

U.S. PATENT DOCUMENTS

| | | | |
|---|---|---|---|
| 6,247,548 B1 | 6/2001 | Hayashi et al. | |
| 2008/0092893 A1 | 4/2008 | Boyle et al. | |
| 2012/0098391 A1* | 4/2012 | Yamasaki | B62D 5/0406 310/68 D |
| 2012/0104886 A1* | 5/2012 | Yamasaki | B62D 5/0406 310/71 |
| 2013/0026965 A1 | 1/2013 | Yoshitake et al. | |

(Continued)

FOREIGN PATENT DOCUMENTS

JP   2012-165600 A   8/2012

OTHER PUBLICATIONS

May 17, 2016 Extended Search Report issued in European Patent Application No. 15201278.7.

*Primary Examiner* — Bernard Rojas
(74) *Attorney, Agent, or Firm* — Oliff PLC

(57) ABSTRACT

A motor unit is provided which shortens an information transmission path between a detector and an arithmetic board. The motor unit includes a motor and a motor controller controlling a rotating operation of the motor based on a rotating angle of the motor such that the motor and the motor controller form a unit. The motor controller includes a resolver detecting a voltage signal corresponding to the rotating operation of the motor. The resolver outputs the voltage signal corresponding to the rotating operation of the motor, to a control board. The resolver is interposed between the motor and the control board and detects a rotating angle of a shaft end of a motor shaft extending beyond an operation performing apparatus that performs an operation of supplying driving power to the motor, to a position closer to the control board.

6 Claims, 2 Drawing Sheets

(56) References Cited

U.S. PATENT DOCUMENTS

2013/0300222 A1* 11/2013 Nakano .............. H02K 11/0084
 310/43
2015/0333600 A1* 11/2015 Nakano .............. H02K 11/0021
 310/71

* cited by examiner

MOTOR UNIT HAVING A DETECTOR INTERPOSED BETWEEN A MOTOR AND AN ARITHMETIC BOARD

INCORPORATION BY REFERENCE

The disclosure of Japanese Patent Application No. 2014-262982 filed on Dec. 25, 2014 including the specification, drawings and abstract, is incorporated herein by reference in its entirety.

BACKGROUND OF THE INVENTION

1. Field of the Invention

The present invention relates to a motor unit.

2. Description of Related Art

For example, Japanese Patent Application Publication No. 2012-165600 (JP 2012-165600 A) discloses and describes a motor (motor unit) that includes a motor having a motor shaft to perform a rotating operation and a control apparatus controlling the rotating operation of the motor and in which the motor and the control apparatus are integrated into a unit. The motor in JP 2012-165600 A is provided with a resolver as a detector that detects information indicative of the rotating angle of the motor (rotor) with respect to a cover member of a housing that houses a stator, the rotor, and the like. Such a resolver passes the detected information indicative of the rotating angle of the motor, via a connection terminal serving as an information transmission path, to a circuit board (arithmetic board) provided in the control apparatus such that a heat sink is interposed between the resolver and the circuit board. The control apparatus then controls driving power to be supplied to the motor, that is, the rotating operation of the motor, based on the rotating angle of the motor calculated by the circuit board using the detected information indicative of the rotating angle of the motor that has been received from the resolver.

To allow the rotating operation of the motor to be controlled as described above, the information indicative of the rotating angle of the motor needs to be passed from the resolver to the circuit board. The length of the connection terminal needs to be increased consistently with an increase in distance between the resolver and the circuit board in order to connect the resolver and the circuit board. That is, in this case, when the resolver and the circuit board are actually connected together, the connection terminal needs to be extended by processing such as welding.

SUMMARY OF THE INVENTION

An object of the present invention is to provide a motor unit that enables shortening of an information transmission path between a detector and an arithmetic board and that allows the detector and the arithmetic board to be located close to each other.

In an aspect of the present invention, a motor unit includes:
a motor configured to perform a rotating operation; and
a control apparatus that controls the rotating operation of the motor based on a rotating angle of the motor.
The motor and the control apparatus are housed in a common housing as a unit.
The control apparatus includes:
a detector that detects information changing in accordance with the rotating operation of the motor,
an information transmission path through which information detected by the detector is transmitted, and
an arithmetic board that is provided so as to face the motor and that calculates the rotating angle of the motor using the information detected by the detector and transmitted via the information transmission path.
The motor includes a motor shaft that allows rotation of the motor to be output to an outside. An end of the motor shaft on the opposite side from an output side extends from the motor to a position in the control apparatus, which is closer to the arithmetic board than to the motor.
The detector is interposed between the motor and the arithmetic board and provided so as to detect the information changing in accordance with the rotating operation of the motor based on the rotating operation of the end of the motor shaft on the opposite side from the output side.

If the rotating operation of the motor is controlled based on the rotating angle of the motor, when the information changing in accordance with the rotating operation of the motor is detected, a configuration with a shorter distance between the detector and the motor, which is a detection target, is more advantageous. However, when the information changing in accordance with the rotating operation of the motor is transmitted, if the detector is not provided near the arithmetic board to which the information is transmitted, the information transmission path through which the information is transmitted must be extended. Therefore, arranging the detector close to the motor is in a trade-off relationship with arranging the detector close to the arithmetic board.

In this regard, in the above-described configuration, the detector is interposed between the motor and the arithmetic board and provided so as to detect the information changing in accordance with the rotating operation of the motor based on the rotating operation of the end, on the opposite side from the output side, of the motor shaft that extends to a position closer to the arithmetic board than to the motor. Thus, with the distance between the detector and the motor limited, the detector is located closer to the arithmetic board than to the motor. That is, in this case, even though the information changing in accordance with the rotating operation of the motor is detected, the extension of the information transmission path is suppressed. Thus, the information transmission path can be shortened, and the detector and the arithmetic board can be located close to each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
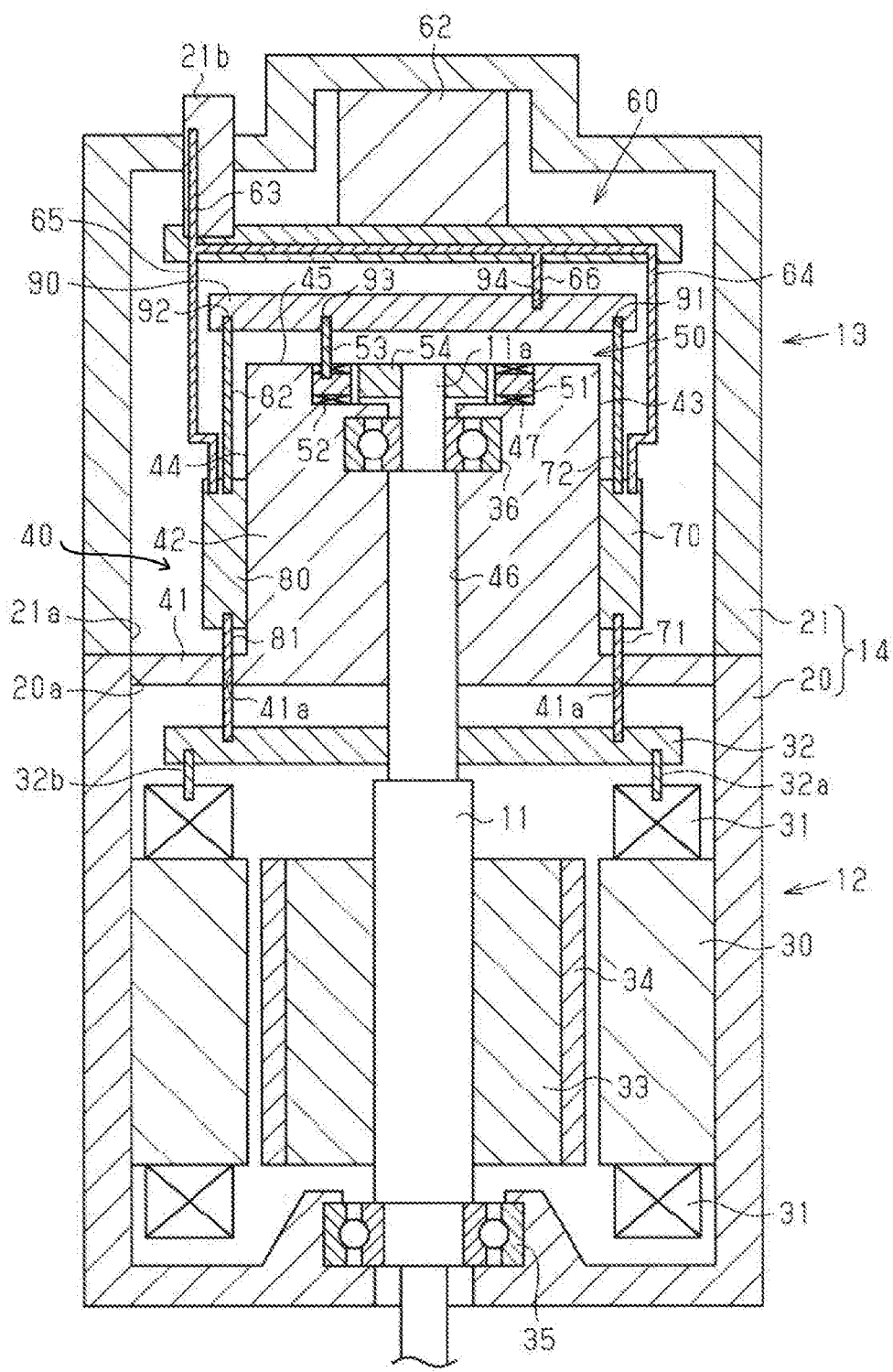
FIG. 1 is a sectional view schematically depicting a motor unit.

An embodiment of a motor unit in the present invention will be described. As depicted in FIG. 1, the motor unit includes a motor 12 that has a motor shaft 11 and is supplied with driving power to perform a rotating operation, and a motor controller 13 that can perform control that allows the motor 12 to perform the rotating operation, and the motor 12 and the motor controller 13 are housed in a common motor housing 14 as a unit. The motor unit in the present embodiment is, for example, mounted in an electric power steering system in a vehicle. The electric power steering system controls the motor unit so as to generate an assist torque corresponding to a steering torque exerted when a driver of the vehicle operates a steering wheel.

As depicted in FIG. 1, the motor housing 14 includes a cylindrical stator housing 20 with an opening 20a. The opening 20a in the stator housing 20 is closed by a cylindrical cover 21 with an opening 21a. That is, the stator housing 20 and the cover 21 are assembled together such that the openings 20a and 21a face and close each other, to form the motor housing 14.

As depicted in FIG. 1, the stator housing 20 houses the motor 12 including a stator 30 and a rotor 33. That is, the cylindrical stator 30 with a plurality of teeth formed thereon is fixed to an inner periphery of the stator housing 20. A motor coil 31 is wound around each of the teeth on the stator 30 via an insulator. Lead wires 32a and 32b serving as connection ends of the motor coil 31 are each connected to a motor bus bar 32 for a corresponding phase (one of the three phases of a U phase, a V phase, and a W phase).

On an inner peripheral side of the stator 30, the cylindrical rotor 33 rotating together with the motor shaft 11 is externally fitted over the motor shaft 11. A plurality of permanent magnets 34 formed like rectangular plates is fixed to an outer periphery of the rotor 33. The permanent magnets 34 are configured such that different poles (N poles and S poles) are alternately arranged in a circumferential direction of the rotor 33.

The above-described stator 30, motor coils 31, motor bus bar 32, rotor 33, and permanent magnets 34 are components of the motor 12. The motor shaft 11 of the motor 12 has a length set such that an output side of the motor shaft 11 extends to the outside of the motor housing 14 so as to allow a rotation torque of the motor 12 to be output. The motor shaft 11 is rotatably supported by a bearing 35 fixed to the stator housing 20. The length of the motor shaft 11 is also set such that a part of the motor shaft 11 on the opposite side from the output side extends from the stator housing 20 to a position in the motor controller 13 inside the cover 21, which is closer to a control board 90 described below than to the motor 12. The motor shaft 11 is rotatably supported by a bearing 36 fixed to a heat sink 40 described later.

At a portion of the motor shaft 11 closer to a shaft end 11a of the motor shaft 11 on such a side that the motor shaft 11 extends into the cover 21, a resolver 50 serving as a detector that detects information used to calculate the rotating angle of the motor 12 (rotor 33) is installed coaxially with the rotor 33.

In the above-described motor 12, a rotating magnetic field is generated by supplying the motor coils 31 with three-phase driving power in accordance with the rotating angle of the rotor calculated using a detection result from the resolver 50. The rotor 33 rotates based on the relationship between each of the permanent magnets 34 and the rotating magnetic field generated by the motor 12.

The cover 21 houses the motor controller 13. A connector 21b connected to external connection equipment such as an external power supply is provided on the opposite side of the cover 21 from the opening 21a. A power supply circuit board 60 (a component of the motor controller 13) forming a supply path through which the driving power is supplied to the motor 12 is electrically connected to the connector 21b. The power supply circuit board 60 is fixed to the cover 21 at a position that is farthest from the motor 12, with predetermined fixation means (screws or the like).

The motor controller 13 includes a heat sink 40 that forms a base in which components of the motor controller 13 are installed and that has a function to promote heat dissipation from the motor controller 13.

The heat sink 40 includes a circular foundation portion 41 fitted in the opening 20a of the stator housing 20. On the foundation portion 41, an installation portion 42 shaped like a rectangular parallelepiped is provided so as to extend in a direction opposite to the motor 12 from the center of the foundation portion 41. Installation surfaces 43 to 45 on which the components of the motor controller 13 can be installed are formed on the installation portion 42. Two communication ports 41a are formed in an outer periphery of the foundation portion 41 so as to allow a front surface and a back surface of the foundation portion 41 to communicate with each other.

A through-hole 46 through which the motor shaft 11 is inserted is formed inside the heat sink 40. The through-hole 46 extends from a side of the foundation portion 41 closer to the motor 12 so as to communicate with an open recess portion 47 that is formed in the installation surface 45, of the installation surfaces 43 to 45, which is on the opposite side of the foundation portion 41 and located farthest from the motor 12 (foundation portion 41). A bearing 36 is housed in the open recess portion 47 on the motor 12 side (on the side away from the installation surface 45) along an axial-length direction of the motor shaft 11. The resolver 50 is housed (installed) in the open recess portion 47 on the opposite side from the bearing 36. That is, in this case, the resolver 50 is arranged, in the heat sink 40, closer to the installation surface 45 than to the motor 12 (foundation portion 41).

Specifically, a cylindrical resolver stator 51 with a plurality of teeth formed thereon is fixed to an inner periphery of the open recess portion 47. A resolver coil 52 is wound around each of the teeth of the resolver stator 51 via an insulator. An output terminal 53 is electrically connected to the resolver coil 52 to serve as an information transmission path through which information used to calculate the rotating angle of the motor 12 is output (transmitted).

On an inner peripheral side of the resolver stator 51, a resolver rotor 54 that rotates together with the motor shaft 11 is externally fitted over a shaft end 11a of the motor shaft 11. The resolver rotor 54 is shaped such that a gap between the resolver rotor 54 and the resolver stator 51 changes in accordance with the rotating operation (rotating angle) of the motor shaft 11 (rotor 33).

The above-described resolver stator 51, resolver coils 52, output terminal 53, and resolver rotor 54 are components of the resolver 50. In the resolver 50 described above, when the motor shaft 11 (rotor 33) rotates, a magnetic flux that is generated by an excitation winding of the resolver coils 52 and that is interlinked with an output winding is changed to change a voltage induced by the output winding. A voltage signal (electric signal) corresponding to the rotating angle of the motor 12 is then output (transmitted) through the output winding via the output terminal 53 as information. Thus, a detection accuracy for the voltage signal corresponding to the rotating angle of the motor 12 is related to the resolver coils 52, that is, the resolver stator 51. In the present embodiment, the resolver stator 51 is fixed to the heat sink 40, and thus, the resolver 50 is substantially fixed to the heat sink 40.

In the installation portion 42, a first module 70 and a second module 80 (components of the motor controller 13) are installed on the installation surface 43, which perpendicularly crosses the foundation portion 41, and the installation surface 44, which faces the installation surface 43, respectively. The first module 70 and the second module 80 each have a rectangular shape, serve as an operation performing apparatus that performs an operation of supplying driving power to the motor 12, and are located outside the motor shaft 11 in a radial direction. The modules 70 and 80 are fixed to the installation surfaces 43 and 44, respectively, that is, to the heat sink 40, with fixation means (screws or the like), so as to directly surface-contact the heat sink 40. The modules 70 and 80 are fixed to the installation surfaces 43 and 44, respectively, at a position relatively close to the motor 12 (foundation portion 41). That is, in this case, the modules 70 and 80 are arranged closer to the motor 12 than to the resolver 50 in the heat sink 40.

The present embodiment includes two control systems in which, in addition to the first module 70, the second module 80 is provided for backup to control the rotating operation of the motor 12. For the modules 70 and 80, the first module 70 is basically operated, and for example, when the first module 70 fails, the control is shifted to the second module 80, which is then operated.

The control board 90 (component of the motor controller 13) is arranged on the installation surface 45, i.e., between the heat sink 40 and the power supply circuit board 60. The control board 90 serves as an arithmetic board that calculates the rotating angle of the motor 12 and controls operations of the modules 70 and 80. The control board 90 is fixed to the installation surface 45, that is, to the heat sink 40, with predetermined fixation means (screws or the like). That is, in this case, the control board 90 is arranged so as to face the motor 12 and to be located farther from the motor 12 than the resolver 50 and closer to the resolver 50 than the motor 12. The shaft end 11a of the motor shaft 11 extends to the resolver 50 (resolver rotor 54) that is located closer to the control board 90 than to the motor 12, and is thus arranged to extend to a position in the motor controller 13, which is closer to the control board 90 than to the motor 12.

Now, an electrical configuration of the motor controller 13 will be described. Many wiring electronic components 62 are mounted on the power supply circuit board 60, such as a choke coil that reduces noise by cutting off a portion of driving power supplied by an external power supply, which belongs to an excess frequency domain, and an electrolytic capacitor that reduces noise by smoothing the driving power supplied by the external power supply. When the motor 12 performs the rotating operation, heat dissipation from the power supply circuit board 60 is promoted by the heat sink 40, but the power supply circuit board 60 generates heat.

The power supply circuit board 60 is also provided with a power supply bus bar 63 electrically connected at one end thereof to the external power supply via the connector 21b. The other end of the power supply bus bar 63 is divided into three branches. Two of the three branches form module terminals 64 and 65 electrically connected to the first module 70 and the second module 80, respectively. The remaining one branch forms a board terminal 66 electrically connected to the control board 90.

Each of the modules 70 and 80 is configured as a module in which a plurality of switching elements such as FETs is integrated as semiconductor devices. That is, each of the modules 70 and 80 contains a driving circuit including an inverter circuit and a power supply relay circuit that supply driving power in three phases (U phase, V phase, and W phase) based on the driving power supplied by the external power supply.

Each of the modules 70 and 80 constantly performs an operation of supplying the driving power to the motor while the motor is performing the rotating operation. Thus, heat dissipation from the modules 70 and 80 is promoted by the heat sink 40, but each of the modules 70 and 80 generates heat. Among the components of the motor controller 13, the modules 70 and 80 are particularly prone to become hot due to heat generation.

The driving power is supplied to the driving circuits in the modules 70 and 80 via the module terminals 64 and 65, respectively. The modules 70 and 80 are provided with phase terminals 71 and 81 through which the driving power in each phase from the driving circuits in the modules 70 and 80 is supplied. The driving circuits supply the driving power to the motor 12 via the phase terminals 71 and 81. The phase terminals 71 and 81 are each connected to the motor bus bar 32 for the corresponding phase (one of the three phases of the U phase, the V phase, and the W phase). The phase terminals 71 and 81 pass through the communication ports 41a in the foundation portion 41 into the stator housing 20 and are each connected to the corresponding motor bus bar 32 inside the stator housing 20.

The modules 70 and 80 are provided with signal terminals 72 and 82 through which various signals such as control signals are transmitted to and received from the control board 90. The signal terminals 72 and 82 extend from the modules 70 and 80 to the control board 90 to electrically connect the modules 70 and 80 to the control board 90. Operation of the driving circuits in the modules 70 and 80 are controlled based on control signals indicating operations (switching) of the switching elements in the inverter circuit and received from the control board 90 via the signal terminals 72 and 82, respectively. The driving circuits in the modules 70 and 80 output control signals indicative of current values monitored by the inverter circuit, to the control board 90 via the signal terminals 72 and 82, respectively.

Many controlling electronic components such as a microprocessor and a ROM are mounted on the control board 90 to form a control circuit that calculates the rotating angle of the motor 12 and that outputs various control signals based on the result of the calculation to control the operations of the modules 70 and 80 (driving circuits). When the motor performs the rotating operation, heat dissipation from the control board 90 is promoted by the heat sink 40, but the control board 90 generates heat.

Insertion holes 91 and 92 are formed in the control board 90 such that the signal terminals 72 and 82 electrically connecting the control board 90 and the modules 70 and 80 are inserted through the insertion holes 91 and 92, respectively. The control board 90 receives the control signals indicative of the current values for the driving circuits (inverter circuits or the like) from the modules 70 and 80 via the signal terminals 72 and 82, and outputs the control signals indicating the operations (switching) of the switching elements in the driving circuits (inverter circuits or the like), to the modules 70 and 80 via the signal terminals 72 and 82.

An insertion hole 93 is also formed in the control board 90 such that the output terminal 53 electrically connecting the control board 90 and the resolver 50 is inserted through the insertion hole 93. The control board 90 receives the voltage signal (electric signal) corresponding to the rotating angle of the motor 12 (the voltage signal is transmitted to the control board 90) from the resolver 50 via the output terminal 53 to calculate the rotating angle of the motor 12 based on the voltage signal. Since the resolver 50 and the control board 90 are arranged close to each other with respect to the motor 12, this configuration allows the resolver 50 and the control board 90 to be connected together with relatively short terminals (wires), compared to a configuration in which the resolver 50 is arranged closer to the motor 12 than to the control board 90.

An insertion hole 94 is also formed in the control board 90 such that the board terminal 66 electrically connecting the control board 90 and the power supply circuit board 60 is inserted through the insertion hole 94. The driving power is supplied to the control board 90 via the board terminal 66.

In the motor unit configured as described above, the motor 1, the heat sink 40, the resolver 50, the modules 70 and 80, and the control board 90 are in the following positional relationship.

Figure 2:
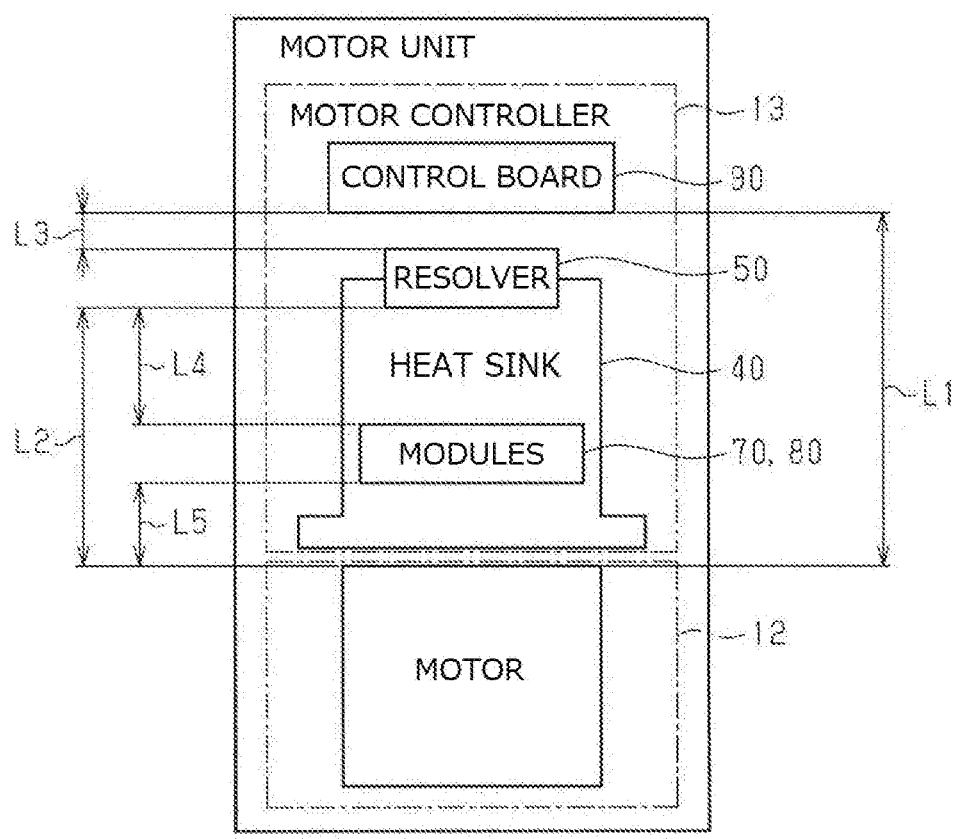
FIG. 2 is a diagram schematically depicting positional relationship among components of the motor unit.

Specifically, as depicted in FIG. 1 and FIG. 2, the resolver 50 is installed between the motor 12 and the control board 90. The resolver 50 is installed closer to the control board 90 than to the motor 12.

That is, in this case, the resolver 50 is arranged as far as possible from the motor 12 that is a detection target for detection of the rotating angle of the motor 12, and as close as possible to the control board 90 to which the detected rotating angle of the motor 12 is input.

In particular, as depicted in FIG. 2, when a distance between the motor 12 and the control board 90 is denoted as L1, a distance between the motor 12 and the resolver 50 is denoted by L2, and a distance between the resolver 50 and the control board 90 is denoted as L3, the resolver 50 is installed within the distance L1. In this case, the motor 12, the resolver 50, and the control board 90 are installed so as to satisfy the relationship "distance L3<distance L2 (<distance 1).

As depicted in FIG. 1 and FIG. 2, the heat sink 40 is installed between the motor 12 and the resolver 50 (control board 90). The modules 70 and 80 are installed between the motor 12 and the control board 90 (resolver 50). The resolver 50 is arranged closer to the control board 90 than to the modules 70 and 80. In other words, the modules 70 and 80 are installed on the heat sink 40 between the motor 12 and the resolver 50 so as to be arranged closer to the motor 12 than to the resolver 50.

That is, in this case, the resolver 50 is arranged as far as possible from the modules 70 and 80 that are particularly prone to generate heat and become hot while the motor 12 is performing the rotating operation, and as close as possible to the control board 90 to which the detected rotating angle of the motor 12 is input.

In particular, as depicted in FIG. 2, when a distance between the resolver 50 and the modules 70 and 80 is denoted as L4 and a distance between the motor 12 and the modules 70 and 80 is denoted as L5, the heat sink 40 and the modules 70 and 80 are installed within the distance L2 by which the resolver 50 is separated from the motor 12. In this case, the motor 12, the resolver 50, and the modules 70 and 80 are installed so as to satisfy the relationship "distance L5<distance L4 (<distance 2). Furthermore, in this case, with the resolver 50 and the modules 70 and 80 installed within the distance L1, the motor 12, the resolver 50, the modules 70 and 80, and the control board 90 are installed so as to satisfy the relationship "distance L3 (the distance between the resolver 50 and the control board 90)<distance L4 (<distance L1).

Effects described in (1) to (7) below are produced by the motor unit in the present embodiment in which the motor 12, the heat sink 40, the resolver 50, the modules 70 and 80, and the control board 90 are installed so as to meet the above-described positional relationship.

(1) If the rotating operation of the motor 12 is controlled based on the rotating angle of the motor 12, when the voltage signal is detected as information changing in accordance with the rotating operation of the motor 12 as in the present embodiment, arranging the resolver 50 closer to the motor 12, which is the detection target, is more convenient. However, when the voltage signal corresponding to the rotating angle of the motor 12 is input to the control board 90, the output terminal 53 of the resolver 50, through which the voltage signal is output (input), must be extended unless the resolver 50 is installed close to the control board 90. Therefore, arranging the resolver 50 close to the motor 12 is in a trade-off relationship with arranging the resolver 50 close to the control board 90.

In this regard, in the present embodiment, the resolver 50 is interposed between the motor 12 and the control board 90 and provided so as to detect the voltage signal corresponding to the rotating angle of the motor 12 based on the rotating operation of the shaft end 11*a* of the motor shaft 11 that extends to a position closer to the control board 90 than to the motor 12. Consequently, with the distance from the resolver 50 to the motor 12 limited to the distance L1 (the resolver 50 is prevented from lying excessively away from the motor 12), the resolver 50 is arranged closer to the control board 90 than to the motor 12 (the relationship "distance L3>distance L2" is met). That is, in this case, even though the voltage signal corresponding to the rotating angle of the motor 12 is detected, the extension of the output terminal 53 of the resolver 50 is suppressed. Thus, the output terminal 53 can be shortened, and the resolver 50 and the control board 90 can be arranged close to each other.

(2) In the present embodiment, when the output terminal 53 of the resolver 50 can be shortened as described above, the terminal length (transmission path length) of the output terminal 53 need not be increased by processing such as welding. For example, when the resolver 50 and the control board 90 are constructed by inserting the output terminal 53 of the resolver 50 through the insertion hole 93 in the control board 90, if the output terminal 53 needs to be extended by processing, high accuracy is needed not only for the processing but also for the output terminal 53 (particularly the tip of the output terminal 53) which is inserted through the insertion hole 93.

On the other hand, when the output terminal 53 of the resolver 50 need not be extended by processing as in the present embodiment, the accuracy needed for the output terminal 53 (particularly the tip of the output terminal 53) which is inserted through the insertion hole 93 is not so high as the accuracy needed when the output terminal 53 needs to be extended by processing. That is, in this case, the yield of the output terminal 53 of the resolver 50 can be restrained from decreasing. Moreover, since the output terminal 53 need not be processed, the possibility that noise is mixed into information output through the output terminal 53 can be reduced. Consequently, the information can be made more reliable.

(3) As described above, in the present embodiment, the resolver 50 is not located excessively away from the motor 12. However, the resolver is still located away from the motor 12, compared to the configuration in which the resolver 50 is provided substantially integrally with the motor 12 (for example, the configuration described in JP 2012-165600). Thus, the resolver 50 may fail to appropriately detect the voltage signal corresponding to the rotating angle of the motor 12.

According to the present embodiment, even when not installed substantially integrally with the motor 12 but installed closer to the control board 90 than to the motor 12 to be located away from the motor 12, the resolver 50 can appropriately detect the rotating operation of the motor shaft 11 extending to the motor controller 13. That is, in this case, the output terminal 53 of the resolver 50 can be shortened, and the resolver 50 can detect the voltage signal corresponding to the rotating angle of the motor 12 even when the resolver 50 and the control board 90 are located close to each other.

(4) The modules 70 and 80 in the present embodiment constantly perform the operation of supplying the driving power to the motor 12 while the motor 12 is performing the rotating operation. Thus, among the components of the motor controller 13, the modules 70 and 80 are particularly prone to become hot due to heat generation. The accuracy at which the voltage signal corresponding to the rotating angle of the motor 12 is detected in accordance with the resolver scheme adopted in the present embodiment is generally likely to be affected by a change in ambient temperature. In particular, the detection accuracy decreases at a high temperature. Thus, arranging the resolver 50 closer to the modules 70 and 80 is less advantageous.

According to the present embodiment, when the modules 70 and 80 are installed between the motor 12 and the control board 90 (within the distance L1), the resolver 50 is arranged closer to the control board 90 than to the modules 70 and 80 (the relationship "distance L3<distance L4 is met), while not being located excessively away from the motor 12. That is, in this case, even when the resolver scheme is adopted in which the detection accuracy for the voltage signal corresponding to the rotating angle of the motor 12 is likely to be affected by a change in ambient temperature, it is possible to reduce the adverse effect, on the detection accuracy of the resolver 50, of heat generated by the modules 70 and 80 that are particularly likely to become hot due to the heat.

(5) In the present embodiment, when the motor 12 performs the rotating operation, the control board 90 also generates heat and becomes hot, though not becoming so hot as the modules 70 and 80, as described above.

In this regard, in the present embodiment, when the motor 12 performs the rotating operation, heat dissipation from the modules 70 and 80 and the control board 90 is promoted by the heat sink 40. Moreover, when provided between the motor 12 and the resolver 50 (within the distance L2), the heat sink 40 is arranged in an area where the modules 70 and 80 are arranged. Therefore, since heat dissipation from the modules 70 and 80 and the control board 90 is promoted by the heat sink 40, the adverse effect, on the detection accuracy of the resolver 50, of heat generated by the modules 70 and 80 and the control board 90 can be suppressed.

(6) When the resolver 50 is fixed to the heat sink 40 as in the present embodiment, even if the modules 70 and 80, the control board 90, and the like generate heat and the generated heat is transferred to the resolver 50, dissipation of the transferred heat is promoted by the heat sink 40. That is, in this case, the adverse effect, on the detection accuracy of the resolver 50, of the heat generated by the modules 70 and 80, the control board 90, and the like can be suitably suppressed.

(7) In the present embodiment, the modules 70 and 80 are fixed to the heat sink 40 so as to directly surface-contact the heat sink 40. That is, in this case, while the motor 12 is performing the rotating operation, heat dissipation from the modules 70 and 80 is suitably promoted by the heat sink 40. Therefore, the adverse effect, on the detection accuracy of the resolver 50, of the heat generated by the modules 70 and 80 can be more suitably suppressed.

(8) In the present embodiment, the operation performing apparatus is fixed to the heat sink. In this configuration, when the motor performs the rotating operation, heat dissipation from the operation performing apparatus is suitably promoted by the heat sink. Thus, the adverse effect, on the detection accuracy of the detector, of heat generated by the operation performing apparatus can be more suitably suppressed.

The above-described embodiment may be appropriately modified and implemented in the following manners. The modules 70 and 80 may be optionally arranged so long as heat dissipation from the modules 70 and 80 is promoted by the heat sink 40. The modules 70 and 80 need not directly contact the heat sink 40 and need not be fixed to the heat sink 40.

The resolver 50 only need be arranged in such a manner that heat dissipation from the resolver 50 is promoted by the heat sink 40. The resolver 50 need not directly contact the heat sink 40 and need not be fixed to the heat sink 40.

The motor unit only need be configured such that heat dissipation from the modules 70 and 80, the control board 90, and the like can be promoted. A cooling structure such as air cooling with an air blower (fan) may be used instead of the heat sink 40.

The heat sink 40 only need be configured in such a manner that the heat sink 40 promotes heat dissipation from the modules 70 and 80, control board 90, and the like, and the arrangement of the heat sink 40 may be changed. For example, the heat sink 40 may be installed between the motor 12 and the modules 70 and 80.

The arrangement of the modules 70 and 80 may be changed. For example, the modules 70 and 80 may be installed between the resolver 50 and the control board 90. The arrangement of the resolver 50 may be changed so long as the resolver 50 is at least installed closer to the control board 90 than to the motor 12. For example, the resolver 50 may be installed closer to the modules 70 and 80 than to the control board 90 (distance L4<distance L3) or installed substantially midway between the control board 90 and the modules 70 and 80.

The rotating angle of the motor 12 may be detected using a magnetic sensor including a magnetoresistive effect element that detects a change in magnetic force generated by a magnet. Even when such a magnetic sensor is used, the effects of the above-described embodiment can be produced.

In the present embodiment, the two control systems including the modules 70 and 80 are provided. However, a single control system including one of the modules 70 and 80 may be provided. The modules 70 and 80 may contact the heat sink 40 via thermal grease. The connector 21*b* may protrude from a side surface of the cover 21.

What is claimed is:

1. A motor unit comprising:
   a motor configured to perform a rotating operation; and
   a control apparatus that controls the rotating operation of the motor based on a rotating angle of the motor, the motor and the control apparatus being housed in a common housing as a unit, the control apparatus having:
   a detector that detects information changing in accordance with the rotating operation of the motor;
   an information transmission path through which information detected by the detector is transmitted;
   an arithmetic board that is provided so as to face the motor and that calculates the rotating angle of the motor using the information detected by the detector and transmitted via the information transmission path; and
   a heat sink that promotes heat dissipation from the arithmetic board;

the motor including:

a motor shaft that allows rotation of the motor to be output to an outside; and an end of the motor shaft on an opposite side from an output side that extends from the motor to a position in the control apparatus, which is closer to the arithmetic board than to the motor; and a bearing that supports the end of the motor shaft on the opposite side from the output side, the bearing being fixed in a recess portion formed in an end surface of the heat sink which faces the arithmetic board, wherein the detector is interposed between the motor and the arithmetic board and provided so as to detect the information changing in accordance with the rotating operation of the motor based on a rotating operation of the end of the motor shaft on the opposite side from the output side.

2. The motor unit according to claim 1, wherein the control apparatus includes an operation performing apparatus that performs an operation of supplying driving power to the motor, the operation performing apparatus is interposed between the motor and the arithmetic board, and the detector is provided closer to the arithmetic board than to the operation performing apparatus.

3. The motor unit according to claim 2, wherein the heat sink promotes heat dissipation from the operation performing apparatus and is interposed between the motor and the detector.

4. The motor unit according to claim 1, wherein the detector is fixed to the heat sink.

5. The motor unit according to claim 3, wherein the operation performing apparatus is fixed to the heat sink.

6. The motor unit according to claim 1, wherein the heat sink is fixed to the common housing.

* * * * *